United States Patent
Grebnov et al.

(10) Patent No.: US 10,021,186 B2
(45) Date of Patent: Jul. 10, 2018

(54) GUARANTEED DELIVERY OF REPLICATION MESSAGE

(71) Applicant: MICROSOFT TECHNOLOGY LICENSING, LLC, Redmond, WA (US)

(72) Inventors: Ilya Grebnov, Bellevue, WA (US); Samuel Banina, Bellevue, WA (US); Charles Lamanna, Bellevue, WA (US); Kevin Lam, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 564 days.

(21) Appl. No.: 14/638,202

(22) Filed: Mar. 4, 2015

(65) Prior Publication Data

US 2016/0182633 A1 Jun. 23, 2016

Related U.S. Application Data

(60) Provisional application No. 62/094,843, filed on Dec. 19, 2014.

(51) Int. Cl.
*G06F 15/16* (2006.01)
*H04L 29/08* (2006.01)
*G06F 17/30* (2006.01)

(52) U.S. Cl.
CPC .... *H04L 67/1097* (2013.01); *G06F 17/30212* (2013.01); *G06F 17/30215* (2013.01); *G06F 17/30575* (2013.01)

(58) Field of Classification Search
None
See application file for complete search history.

(56) References Cited

U.S. PATENT DOCUMENTS

| | | | |
|---|---|---|---|
| 5,815,649 A | * | 9/1998 | Utter .................. G06F 11/2071 709/215 |
| 7,523,110 B2 | | 4/2009 | Holenstein et al. |

(Continued)

OTHER PUBLICATIONS

"DFSR Overview", Published on: Nov. 5, 2010, 1 page. Available at: "http://msdn.microsoft.com/en-us/library/bb540025(v=vs.85).aspx".

(Continued)

*Primary Examiner* — Brian Whipple
(74) *Attorney, Agent, or Firm* — Shook, Hardy & Bacon, L.L.P.

(57) ABSTRACT

Aspects of the present invention relate to guaranteeing delivery of replication messages in distributed storage systems. A request to perform an operation may be received. A first replication message corresponding to the request may be created, where the first replication message comprises instructions to replicate the result of the operation to one or more target storages. The replication message may be inserted in a message queue with a delayed visibility. The operation may be performed, where a result of the operation is persisted in a source storage in a data store. Upon determining that the result was successfully persisted in the source storage, a second replication message may be created, where the second replication message comprises instructions to replicate the result of the operation to the one or more target storages. The second replication message may be inserted in the message queue with an immediate visibility.

17 Claims, 10 Drawing Sheets

(56) References Cited

U.S. PATENT DOCUMENTS

| | | | |
|---|---|---|---|
| 7,577,661 | B2 | 8/2009 | Bankston et al. |
| 7,716,181 | B2 | 5/2010 | Todd |
| 7,716,525 | B1 | 5/2010 | Buchko et al. |
| 7,788,223 | B2 | 8/2010 | Liu et al. |
| 8,055,861 | B2 | 11/2011 | Todd et al. |
| 8,301,595 | B2 | 10/2012 | Megginson |
| 8,468,132 | B1 | 6/2013 | O'Neill et al. |
| 8,719,254 | B2 | 5/2014 | Yang et al. |
| 8,782,004 | B2 | 7/2014 | Ducott, III et al. |
| 8,793,691 | B2 | 7/2014 | Devadhar |
| 2004/0240297 | A1* | 12/2004 | Shimooka ............... G11C 7/24 365/222 |
| 2005/0027718 | A1* | 2/2005 | Sakaguchi ......... G06F 17/30067 |
| 2010/0114824 | A1 | 5/2010 | Krishnaprasad et al. |
| 2011/0161289 | A1 | 6/2011 | Pei et al. |
| 2011/0196833 | A1* | 8/2011 | Drobychev ....... G06F 17/30575 707/634 |
| 2011/0196882 | A1 | 8/2011 | Kesselman |
| 2011/0251996 | A1 | 10/2011 | Sustman et al. |
| 2011/0295929 | A1 | 12/2011 | Sagar et al. |
| 2012/0023066 | A1 | 1/2012 | Bourbonnais et al. |
| 2012/0303581 | A1 | 11/2012 | Calder et al. |
| 2013/0124464 | A1 | 5/2013 | Rank et al. |
| 2013/0339295 | A1 | 12/2013 | Dean et al. |
| 2014/0040206 | A1 | 2/2014 | Ramakrishnan et al. |
| 2014/0207850 | A1 | 7/2014 | Bestler et al. |
| 2014/0279855 | A1 | 9/2014 | Tan et al. |
| 2015/0066850 | A1* | 3/2015 | Oliver ................ G06F 11/1464 707/620 |
| 2015/0142855 | A1 | 5/2015 | Fast et al. |

OTHER PUBLICATIONS

Keating, Brian, "Challenges Involved in Multimaster Replication", Published on: Sep. 14, 2008, 13 pages. Available at: "http://www.dbspecialists.com/files/presentations/mm_replication.html".

"Solving Common Replication Conflicts", Published on: Dec. 11, 2012, 3 pages. Available at: "http://www.dbspecialists.com/files/presentations/mm_replication.html".

"Postgres Plus Advanced Server xDB Replication Server User's Guide", Published on: Mar. 8, 2013, 17 pages. Available at: http://www.enterprisedb.com/docs/en/9.2/repguide/Postgres_Plus_xDB_Replication_Server Users_Guide-32.htm.

"Oracle Fusion Middleware Deployment Planning Guide for Oracle Directory Server Enterprise Edition", Published on: Dec. 11, 2012, 4 pages. Available at: "https://docs.oracle.com/cd/E19656-01/821-1502/6nmfv3a55/index.html".

"Configuring Conflict Resolution", Published on: Mar. 24, 2012, 63 pages. Available at: "https://docs.oracle.com/cd/B28359_01/server.111/b28327/rarconflictres.htm#i17665".

"Multimaster Replication", Published on: Sep. 19, 2009, 1 page. Available at: "http://technet.microsoft.com/en-us/library/cc959273.aspx".

Hanselman, Scott, "How to run Background Tasks in asp.net", Published on: Aug. 26, 2014, Available at: http://www.hanselman.com/blog/HowToRunBackgroundTasksInASPNET.aspx.

Notice of Allowance dated Sep. 1, 2017 in U.S. Appl. No. 14/638,357, 20 pages.

* cited by examiner

GUARANTEED DELIVERY OF REPLICATION MESSAGE

CROSS-REFERENCE TO RELATED APPLICATION

This application claims the benefit of U.S. Provisional Patent Application No. 62/094,843, filed Dec. 19, 2014, entitled "GUARANTEED DELIVERY OF REPLICATION MESSAGE," which is incorporated herein by reference in its entirety.

BACKGROUND

Data storage in a distributed computing environment, such as a cloud computing environment, provides the ability to store data over a network. Since the data is distributed over a network (and stored on one or more network servers), a distributed storage system provides marked benefits over conventional storage, such as scalability, durability, and high availability of data. For example, data may be replicated on multiples servers (at different data centers), ensuring that if a server containing a copy of the data becomes inaccessible, the data may still be accessed on a different server.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are directed to guaranteeing delivery of replication messages in distributed storage systems. A request to perform an operation may be received. For example, the operation may be to insert a record (e.g., a row) into a table. A first replication message corresponding to the request may be created, including instructions to replicate the result of the operation to one or more target storages in corresponding data stores. The first replication message may be inserted into a message queue with delayed visibility, i.e., a replication worker may not see the first replication message until the delay has elapsed. The operation may be performed and a result of the operation may be persisted in a source storage in a data store. Upon determining that the result was successfully persisted in the source storage, a second replication message corresponding to the request may be created. The second replication message may also include instructions to replicate the result of the operation to one or more target storages in the corresponding data stores. The second replication message may be inserted in the message queue with immediate visibility. A replication worker may see the second replication message immediately.

BRIEF DESCRIPTION OF THE DRAWINGS

Aspects of the invention are described in detail below with reference to the attached drawing figures, wherein.

DETAILED DESCRIPTION

Figure 1:
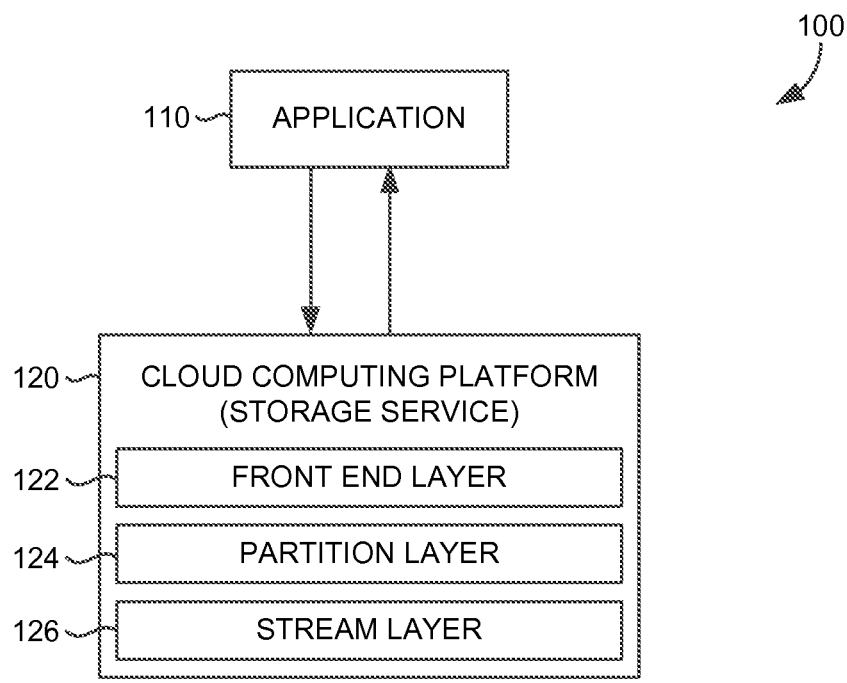
FIG. 1 is a block diagram of an exemplary distributed storage system in which embodiments described herein may be employed.

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b) unless otherwise indicated to the contrary.

Replicating data across multiples servers (at different data centers) in a distributed computing environment ensures that if a data store and/or server storing the data becomes inaccessible, a user may still be able to access the data on a different data store and/or server. For example, a user may want to insert a new record (e.g., a row) into a table. If the table is replicated on multiple data stores, the system may write the record to a first copy of the table (hereinafter also referred to as a "source table") and replicate the changes to the other copies of the table. Ensuring that rows of a table are guaranteed to be replicated to redundant large table data stores when being written to a source table while also ensuring that the table is accessible to users presents a variety of challenges. For example, a user may attempt to retrieve data from a table that has not yet been replicated to. If the user retrieves stale data (i.e., data from a table that has not yet been replicated to), the data will appear incorrect or otherwise provide the user with an incorrect result. To prevent stale data, the system could lock all copies of the table on the data stores to allow for time for the data to synchronize. However, while copies of the table are locked, users may not be able to perform operations on the table. As another alternative, the system may attempt to directly insert data into the copies of the table. However, if the insertion fails at any one of the data stores, or the process of writing the data crashes, the state of the persisted data may be unknown. Thus, challenges exist in ensuring that the copies of the table on the data stores remain synchronized while being accessible to the user.

Solutions include, e.g., in the case of transient errors (e.g., an error due to a temporary connection issue), looping an operation until the insertion is successful in all locations. However, this approach may take a long and indeterminate amount of time from the user's perspective. Furthermore, the probability of encountering transient errors multiplies by the number of redundant copies needed to be stored. Looping also does not work in the case of a process crash (i.e., the operation would be lost).

Embodiments described herein are directed to guaranteeing delivery of replication messages in distributed storage systems. A request to perform an operation may be received. A first replication message corresponding to the request may be created, where the first replication message includes instructions to replicate the result of the operation to one or more target storages (e.g., tables) in corresponding data stores. The replication message may be inserted into a message queue, where the message has a delayed visibility. The operation may then be performed, where a result of the operation is persisted in a source storage (e.g., source table) in a data store. Upon determining that the result was successfully persisted in the source storage, a second replication message corresponding to the request may be created, where the second replication message includes instructions to replicate the result of the operation to the one or more target storages in corresponding data stores. The second replication message may be inserted in the message queue, where the second replication message has an immediate visibility.

CAP Theorem

The CAP theorem, or Brewer's theorem, posits that a distributed computing system cannot simultaneously provide consistency, availability, and partition tolerance. Consistency, as defined by the CAP theorem, requires that data stores at nodes (e.g., computing devices, processing units, or blades in a server rack) of a distributed computing system be consistent. For example, if a change is made at one node, all other nodes must also reflect the change. Alternatively, if a node does not reflect the change, no nodes can reflect the change. Availability, as defined by the CAP theorem, requires that a distributed computing system be responsive to all requests, regardless of whether the response is that the request succeeded or failed. If one of the nodes is offline or inaccessible, the distributed computing system may still send a response from at least one of the other nodes. Partition tolerance, as defined by the CAP theorem, requires that a distributed computing system continue to operate despite arbitrary message loss or failure of part of the system. For example, if part of the distributed computing system is offline, the system may still perform operation and otherwise continue to operate.

In accordance with the CAP theorem, at most two of the three (consistency, availability, and partition tolerance) can be achieved in a distributed computing system. Thus, a distributed system can be described as attempting to achieve one of three goals under the CAP theorem: AP (continuously available and partition tolerant but inconsistent), CP (consistent and partition tolerant but unavailable during partitions), and CA (consistent and continuously available but not tolerant of partitions).

Many traditional storage systems attempt to provide CP (consistent and partition tolerance). Thus, tables will be consistent between servers, and the system will be partition tolerant, e.g., a failure of one server does not result in a failure of the entire system. However, CP forgoes availability, e.g., the tables may not be responsive some of the time. Recently, however, some storage system have begun attempting to provide AP (continuously available and partition tolerance), i.e., some distributed storage systems have providing high availability as a goal.

HADR (High Availability Disaster Recovery)

A HADR (High Availability Disaster Recovery) system may replicate tables across servers to ensure that table data is constantly available. High availability (HA) is a measure of a system's ability to remain accessible in the event of a system component failure. Disaster recovery (DR) is a process by which a system is restored to a previous state, e.g., after a natural or man-made disaster. A HADR system should allow a user to access a table located on at least one server if some of the servers become unresponsive or inoperable. However, strategies must be implemented to keep copies of the table synchronized without substantially affecting the availability of the system.

Eventual consistency is a consistency model used to achieve high availability. Eventual constancy ensures that, if no new updates are made to a given table or data row, all tables will eventually become synchronized and accesses to any of the tables will return the same value. Thus, although at some points in time, data may not be consistent among the tables, the data will eventually become synchronized. Improvements have been made in reducing the amount of time that data remains unsynchronized in these systems. For example, in some systems, it has been demonstrated that eventually consistency can be achieved on the order of five seconds. Thus, consistency may be sacrificed for the sake of improved availability.

Definitions

The terms "source table" and "target table" or "source storage" and "target storage" as used herein are used to describe the relationship between tables. A source table or storage refers to a table to be replicated, and target table or storage refers to a table on which the replication will take place. When performing a read or write operation to a table, a single table may be used to perform the operation (i.e., the source table). In some aspects, the same table may be used for both operations or different tables may be used for each operation. For example, performing a read operation retrieves a row from a table in one data store, and performing a write operation modified a row of a table from another data store. A table may be a source table for one operation, and a target table for a different operation.

For purposes of this disclosure, "tables" and "copies of the table" may be used interchangeably. It should be understood that "tables" in plural form or "copies of the table"

generally refer to replicated copies of a table on the different data stores. "Table" in singular form generally refers to a visualization of a table, unless indicated otherwise. For example, a table X may be replicated on multiple data stores. Each may contain a copy of table X. However, when a user is interacting with table X, they are conceptually interacting with a single table. Thus, from a user's perspective, all copies of the table act are viewed as a single table.

Exemplary Distributed Storage System

For purposes of a detailed discussion below, embodiments are described with reference to a storage service supported by a cloud computing platform, and further by way of example, a cloud computing platform having a front end layer, partition layer, and stream layer. However, the operations described herein can be performed in different types of operating environments having alternate configurations of the functional components described herein. As such, the embodiments described herein are merely exemplary, and it is contemplated that the techniques may be extended to other implementation contexts.

A distributed storage system can be implemented as a cloud computing platform that runs cloud services across different data center and geographic regions. The cloud computing platform can implement a fabric controller component for provisioning and managing resource allocation, deployment/upgrade, and management of cloud services. Typically, a cloud computing system acts to store data or run service applications in a distributed manner. The service-application components (e.g., tenant infrastructure or tenancy) of the cloud computing system may include nodes (e.g., computing devices, processing units, or blades in a server rack) that are allocated to run one or more portions of a tenant's service applications.

When more than one separate service application is being supported by the nodes, the nodes may be partitioned into virtual machines or physical machines that concurrently run the separate service applications, respectively, in individualized computing environments that support the resources and/or operating system specific to each service application. Further, each service application may be divided into functional portions such that each functional portion is able to run on a separate virtual machine. In cloud computing systems, multiple servers may be used to run service applications and perform data storage operations in a cluster. In particular, the servers may perform data operations independently but exposed as a single device referred to as a cluster. Each server in the cluster may be referred to as a node.

A storage service on the cloud computing platform can be a service supported using the fabric controller component. The storage service can be responsible for managing the replication and data placement across disks and load balancing the data and the application traffic with storage clusters. The storage service can be responsible for managing access to a high volume of storage. The storage service can implement a storage stamp as a cluster of N racks of storage nodes and a location service that manages the storage stamps. Specifically the location service can allocate location stamps and manage them across the storage stamps for disaster recovery and load balancing.

With reference to FIG. 1, the architecture 100 of a storage stamp, in a cloud computing platform 120 supporting a storage service, can include a front-end (FE) layer 122, a partition layer 124, and a stream layer 126 (or distributed file system (DFS) layer). The FE layer 122 may be configured to receive incoming requests from an application 110 or client.

Upon receiving a request, the FE layer 122 can authenticate and authorize the request. The FE layer 122 can route the request to a partition server in the partition layer. In embodiments, the FE layer 122 maintains a partition map that keeps track of partition name ranges and which partition server is serving which partition names.

The partition layer 124 is responsible for managing and understanding high level abstractions of user files, structured storages, and messaging. The partition layer 124 also provides a scalable index, transaction ordering, and storing consistency for objects. The partition layer 124 can specifically support storing object data on top of the stream layer 126. In embodiments, the partition layer partitions data objects within a storage stamp.

The stream layer 126 stores bits on disk and supports replicating the data across many servers to keep data durable within a storage stamp. The stream layer 126 supports files called streams which are ordered lists of large storage chunks called extents. The stream layer stores and replicates extents. The data stored in the stream layer is accessible from the partition layer 124. The stream layer 126 may provide a file system namespace and an Application Programming Interface (API) for the partition layer 124 to perform writes. Writes can be append-only. The interface between the stream layer 126 and partition layer 124 allows a client to open, close, delete, rename, append to, and concatenate streams. A stream can refer to an ordered list of extent points, where an extent is a sequence of append blocks. An extent can be a seal extent, such that, the extent can no longer be appended to. An application can read data from extents to access block contents of the extents.

The stream layer 126 can include a stream manager (not shown) and extent node (not shown). The stream manager is responsible for tracking the stream namespace, what extents are in each stream and the extent allocation across extent nodes. The stream manager performs lazy re-replication of extent replicas that are lost due to hardware failures or unavailability. Each extent node maintains the storage for a set of replicas assigned to the corresponding extent by the stream manager. Each extent node contains a view about the extents it owns and where the peer replicas are for a given extent.

A discussion of a suitable architecture of a distributed storage system for performing embodiments described herein is further described in described in U.S. Pat. No. 8,620,884, filed Oct. 24, 2008, and entitled "SCALABLE BLOB STORAGE INTEGRATED WITH SCALABLE STRUCTURED STORAGE," and Calder, Brad et al., "Windows Azure Storage, A Highly Available Cloud Storage Service with Strong Consistency" *SOSP '11 Proceedings of the Twenty-Third ACM Symposium on Operating Systems Principles,* 2011: Pages 143-157. Print, which both are incorporated herein, by reference, in their entirety.

Figure 2:
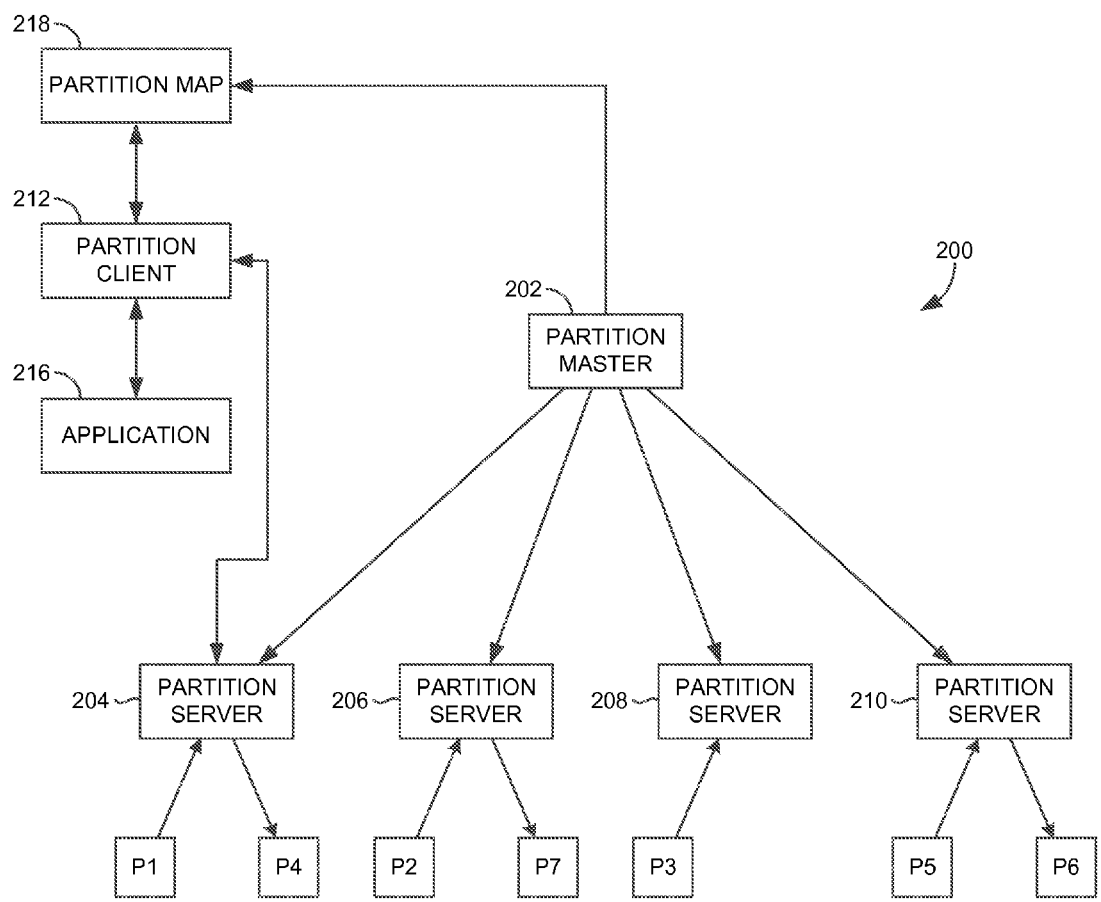
FIG. 2 is a block diagram of an exemplary distributed storage system in which embodiments described herein may be employed.

Referring now to FIG. 2, FIG. 2 illustrates an exemplary distributed storage system in which implementations of the present disclosure may be employed. In particular, FIG. 2 shows a high level architecture of cloud computing system 200 in accordance with implementations of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, cloud computing system 200 may include master 202 (e.g. partition master 202), servers 204, 206, 208, and 210 (e.g. partition servers 204, 206, 208, and 210), and client 212 (e.g. partition client 212). Each may reside on any type of computing device. The components of cloud computing system 200 may communicate with each other over a network, which may include, without limitation, one or more local area networks (LANs) and/or wide area networks (WANs). Although a single master, four servers, and a single client are shown in FIG. 2, any number of masters, servers, and clients may be employed within cloud computing system 200 within the scope of implementations of the present disclosure.

Stored data of cloud computing system 200 is divided amongst a plurality of partitions. For example, cloud computing system 200 can comprise a key space divided amongst the plurality of partitions. Master 202 is configured to assign the partitions to servers 204, 206, 208, and 210, and/or other servers of cloud computing system 200 not shown. Master 202 can also be configured to determine when a partition of the partitions is not hosted by any server due to a failure and reassign the partition to a different server. Master 202 is further configured to control load balancing of the partitions on servers 204, 206, 208, 210, and/or other servers of cloud computing system 200 not shown. Additionally, Master 202 is configured to monitor resource utilization with respect to any of the partitions and/or servers 204, 206, 208, and 210, and/or other servers of cloud computing system 200 not shown. It is further contemplated that master 202 is configured to support integrated resource allocation and load balancing in accordance with embodiments of the present invention, as discussed in more detail below.

In cloud computing system 200, the servers, such as servers 204, 206, 208, and 210 are utilized to store and provide access to a storage system. Master 202 is configured to manage the servers. Furthermore, client 212 is configured to provide applications, such as application 216, access to the storage system. Each server of cloud computing system 200, such as servers 204, 206, 208, and 210, can be responsible for providing read and write access to zero to many partitions assigned to the server. Furthermore, each of the partitions can be assigned to a single one of the servers. In the example shown in FIG. 2, server 204 is hosting partitions P1 and P4, server 206 is hosting partitions P2 and P7, server 208 is hosting partition P3, and server 210 is hosting partitions P5 and P6.

Client 212 may be linked into an application, such as application 216. In some implementations, client 212 is configured to issue commands to some of the partitions (e.g. partitions P1, P2, P3, P4, P5, P6, and P7) hosted by servers 204, 206, 208, and 210 and/or other servers of cloud computing system 200. Also in some implementations, client 212 may communicate with the application indirectly, for example, through a virtual IP and software load balancer or other means that directs communication requests to a front-end. The front-end can utilize a partition map, such as partition map 218, to determine which of the servers is hosting (mapped to) which of the partitions and can send commands to those servers. Results of the commands can be received back from the servers and can be passed to the application. The partition map stores mappings between the partitions and the servers they are assigned to, and can typically be maintained by a master, such as master 202.

Having described various aspects of cloud computing system 200, it is noted that any number of components may be employed to achieve the desired functionality within the scope of the present disclosure. Although the various components of FIG. 2 are shown with lines for the sake of clarity, in reality, delineating various components is not so clear, and metaphorically, the lines may more accurately be grey or fuzzy. Further, although some components of FIG. 2 are depicted as single components, the depictions are exemplary in nature and in number and are not to be construed as limiting for all implementations of the present disclosure.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the table storage 300, may be carried out by a processor executing instructions stored in memory.

Exemplary Table Storage

Figure 3:
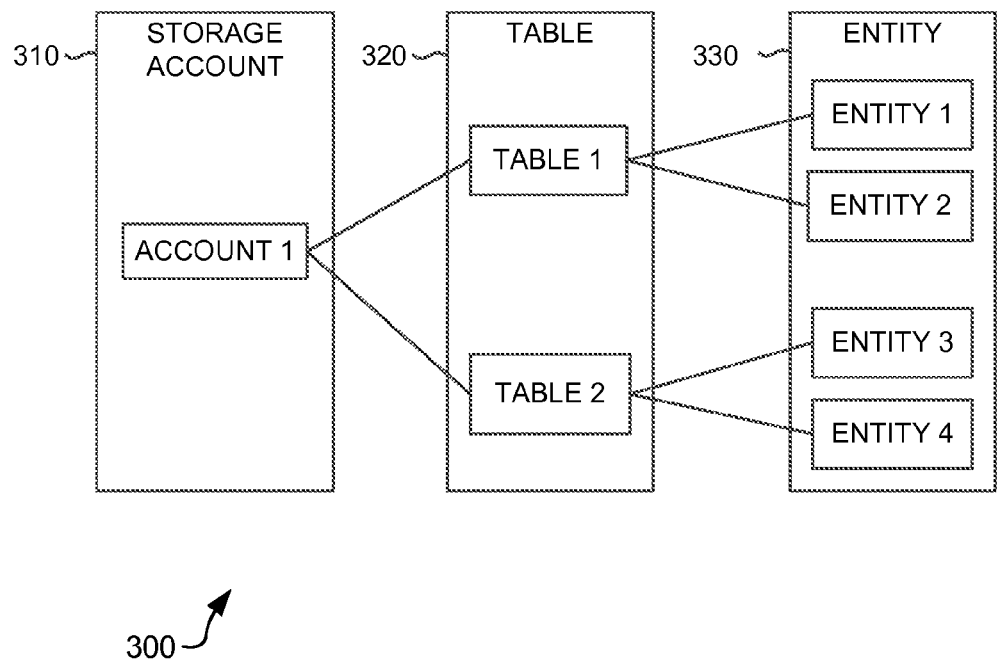
FIG. 3 is a block diagram of an exemplary data model for table storage, in accordance with embodiments described herein.

FIG. 3 illustrates an exemplary data model for table storage, in accordance with an aspect of the present invention. Table storage 300 may be comprised of storage accounts 310, tables, 320, and entities 330. Access to the table storage 300 may be done through the storage account 310. A storage account may have one or more tables 320, and a table 320 may have one or more entities 330. An entity 330 is the base data item stored in a table 320. Each entity may have an identifier and timestamp. The table storage may be part of the stream layer 136, as described in FIG. 1.

Data in the table may be replicated across multiple servers. For example, the data may be spread out over multiple storage nodes. Since the underlying replication layer is a distributed file system, the replicated data may be accessible from all of the partition servers as well as from other DFS servers. The stream layer 136, as described in FIG. 1, stores the data in extents. Each extent may be replicated multiple times.

For a given extent, the stream layer 136 has a primary server and multiple secondary servers. All writes can go through the primary server, which then sends replication requests to the secondary servers. Success may returned back from the primary server to the client once the data is written to at least one DFS servers. If one of the DFS servers is unreachable when performing the write, the DFS layer may choose more servers to write the data to so that (a) all data updates are written before returning success to the client and (b) writes can make forward progress in the face of a DFS server being unreachable. Reads can be processed from any up-to-date extent replica (primary or secondary), so reads can be successfully processed from the extent replicas on secondary DFS servers.

Multiple replicas are kept for each data item, so if one fault domain goes down (i.e., a data store is unreachable), there will be other data stores to access the data from, and the system will dynamically re-replicate the data to bring it back to a healthy number of replicas.

Exemplary Table Replication Architecture

Figure 4:
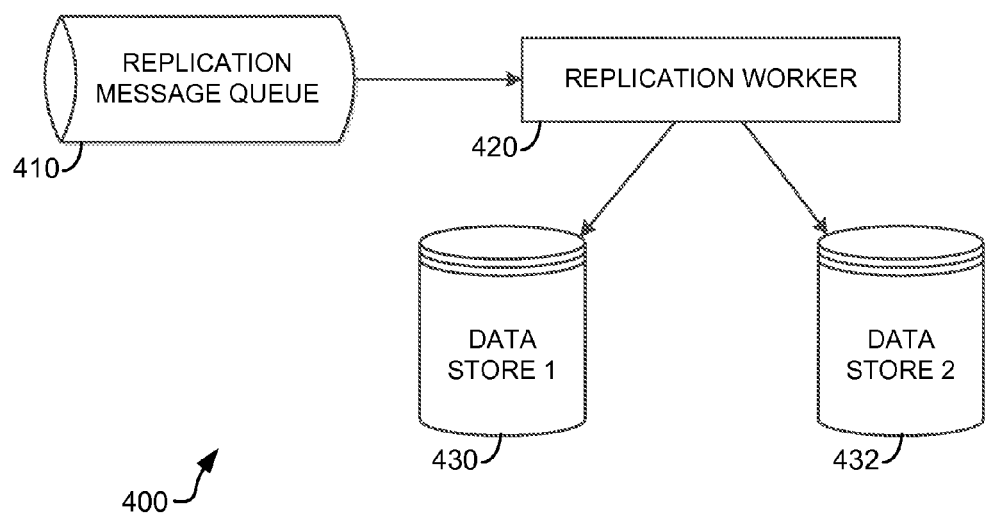
FIG. 4 is a diagram of an exemplary table replication architecture suitable for delivering replication messages, in accordance with embodiments described herein.

Turning now to FIG. 4, an exemplary table replication architecture 400 is depicted in accordance with at least one aspect of the present invention.

The table replication architecture 400 includes replication message queue 410, replication worker 420, and two or more data stores 430, 432. Replication message queue 410 may receive and store replication messages. Replication message queue 410 can use a First-In-First-Out (FIFO) data structure, where new messages are pushed to the top of the queue and older messages are popped from the bottom of the queue. Replication message queue 410 is not limited to a FIFO data structure, and can employ a different data structure, such as using an ordering method to order the messages in the queue, within the scope of implementations of the present disclosure.

Replication worker 420 may retrieve replication messages from replication message queue 410 and perform replication operations on the data stores 430, 432. Data is replicated to multiple data stores to ensure that the data is highly available and can be recovered in the case of a disaster. For example, a replication message may be received by replication message queue 410. When replication worker 420 is able to process the request, replication worker 420 retrieves the replication message. The replication message may indicate that rows of tables in data stores 430, 432 need to be replicated. Thus, replication worker 420 would process the replication message (e.g., perform replication on data stores 430 and 432). Replication worker 420 can continue to process the replication message until the replication is successful.

In the previous example, replication worker 420 performs the replication. However, it should be appreciated that replication worker 420 may process the message in replication message queue 410 and direct another component to perform the actual replication. Furthermore, the previous example shows one replication message queue 410 and one replication worker 420. However, it should be appreciated that there need not be a one-to-one relationship between replication message queue 410 and replication worker 420, and there may be a many-to-one or one-to-many relationship between replication message queue 410 and replication worker 420. Specifically, by having more than one replication worker 420, replication operations can be performed faster, e.g., since each replication worker 420 can perform a different replication operation from replication message queue 410.

Exemplary Method for a Delivering a Replication Message

Figure 5:
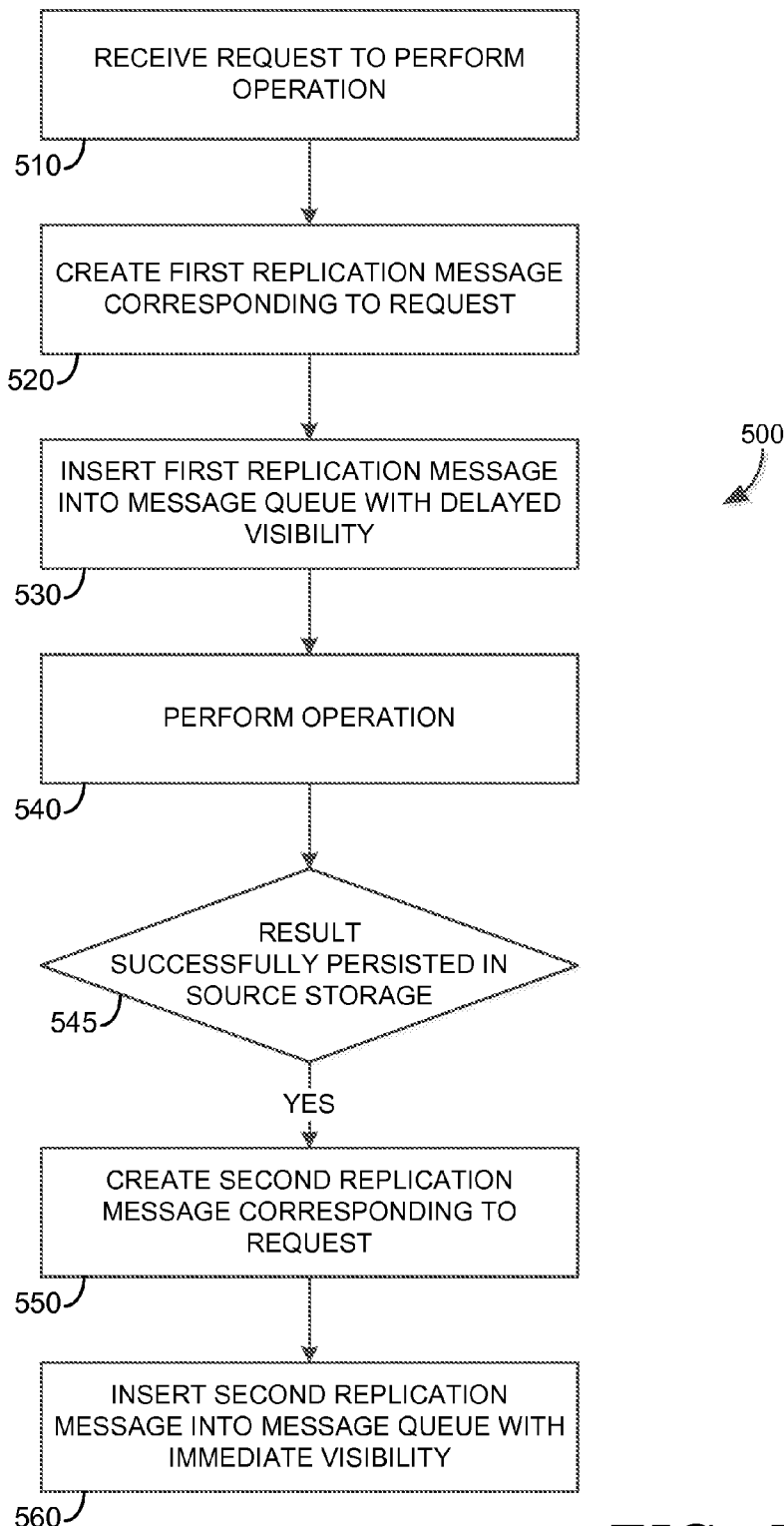
FIG. 5 is a flowchart showing a method of guaranteeing delivery of replication messages in distributed storage systems, in accordance with embodiments described herein.

Turning now to FIG. 5, a method 500 for guaranteeing delivery of replication messages in distributed storage systems is shown, in accordance with an aspect of the present invention. Method 500 may be performed on a one or more servers in a data center or across multiple data centers.

At step 510, a request to perform an operation may be received. The operation may include writing a set of rows to a source table in a data store. For example, a request to insert a new row into a table may be received. The insert operation is just one example of an operation that may be received. It should be understood that the operation is not limited to an insert operation, and other operations may also be performed. For example, a request to perform an update or delete operation may be received.

At step 520, a first replication message may be created corresponding to the request. The first replication message may include instructions to replicate the result of the operation to one or more target storages in corresponding data stores. For example, if the results of the request may be a new table row. The first replication message may instruct the data stores to replicate the new table row on the one or more target storages. The first replication message may further include instructions corresponding to the request including one or more of the one or more target storages (e.g., data store destinations), a timestamp, and a unique key corresponding to the result of the operation to be replicated and persisted in the one or more target storages. However, the message is not limited to the foregoing and may also include other information. For example, a message may contain a username or id. Furthermore, a message need not contain the data store destinations, timestamps, and unique keys of the data to be persisted, and may contain other data indicating which data should be persisted, within the scope of implementations of the present disclosure.

The target storages may be target tables in remote data stores for replicating the result. The target tables may be replicates of a source table. For example, rows of a source table may be replicated so that the target tables contain all of the same data. The source table and each of the target tables can reside in a different location (e.g., different data centers). However, a target table need not reside in a different location from all of the other tables, and can reside in the same location as at least one of the other tables.

At step 530, the first replication message may be inserted into a message queue. The first replication message may have a delayed visibility. For example, the delayed visibility may be one hour. Thus, for one hour, a replication worker attempting to consume messages from the message queue would be unable to view the first message. The delayed visible time may be a quantified time period that is at least longer than a time during which the operation is performed and the result persisted in the source storage. For example, if a write operation is guaranteed to be performed in 10 minutes, the delayed visibility may be set to 10 minutes, ensuring that when the message is consumed, the operation has been performed and the result persisted in the source storage. In some embodiments, a delayed visibility need not be set to a time within which the operation is guaranteed to be performed, and may be set to another time at which the message should be visible. For example, the delayed visibility time may be quantified to factor at least one immediate retry of the operation caused by transient errors. In some embodiments, the operations may have an imposed timeout value. After the timeout value has been exceeded, the operations may be determined to have failed with unknown result.

The message queue can exist in a centralized location and can receive replication messages (or can generate a message based on a request or operation). It should be appreciated, however, that there may be multiple message queues, where at least one message queue is located at the same location as a data store. However, this need not be the case, and there may be one single message queue for all data stores.

At step 540, the operation may be performed. The results of the operation may be persisted in a source storage in a data store. For example, if an insert operation to a table is to be performed, the operation is performed only on the source storage initially. The source storage may be a source table on a local data store. The source storage may be determined by the location of the user or previous interactions with the data stores. The source storage may return an acknowledgement that the operation has been successfully completed. For example, if a row was successfully inserted into the source storage, the source storage may return a success acknowledgement.

At step 550, upon determining that the result was successfully persisted in the source storage (545), a second replication message may be created corresponding to the request. The second replication message may also include instructions to replicate the result of the operation to the one or more target storages in the corresponding data stores. The second replication message may also contain data store destinations, a timestamp, and unique keys of the data to be persisted. For example, the second replication message may be a duplicate of the first message.

At step 560, the second replication message may be inserted into the message queue. The second replication message may have an immediate visibility. The second replication message optimizes replication latency in that replication of the result of the operation may be performed immediately. For example, if the second replication message has an immediate visibility, a replication worker can retrieve the message immediately and replicate the results of the request on a second table of the plurality of tables. Alternatively, the first replication message may be updated to have an immediate visibility when the result is successfully persisted in the source storage.

In some examples, the operation to persist an entirety of the result may be unsuccessful. For example, the operation may be partially processed to the source storage, e.g., one or more rows were not persisted to the source table. The operation may continue to attempt to persist the entirety of the result to the source storage. For example, the operation may be retried a given number of times to attempt to persist the data. However, after multiple attempts the data may still not be fully persisted. If the goal is eventually consistency, as long as the data that is persisted in the source storage is replicated to the target storages, it may not matter that the entirely of the result was not persisted (e.g., an error message may be provided to a user indicating that the result was not persisted). Furthermore, although the entirety of the result was not persisted, the portion of the result that was persisted may be iteratively processed to replicate to the target storages. For example, if two of five rows were successfully persisted in the source storage, the two rows may be replicated (via the replication message) to the target storages. This allows the rows to be consistent through the target storages in corresponding data stores. Upon determining that the entirety of the result was successfully persisted in the source storage, the replication message in the queue to replicate the result of the operation may be processed and the replication message may be dequeued.

The steps as described can be performed as a background process. Thus, a user need not see or know that the tables are replicating. The user may continue to perform operations on the source table without a significant increase in wait time; the user may see a small constant time increase when saving data to a data store, but the data will be immediately available in the source table to be used by the user.

This configuration ensures that a replication message is added to a message queue, guaranteeing the delivery of the replication message. Because the message is created prior to the operation (e.g., insertion of a record), the message is guaranteed to replicate whichever rows are successfully written to the source table to the redundant data stores, even in the event of a process crash. By guaranteeing the delivery of replication messages, this configuration improves the availability of the tables and ensures that the data in a table will be consistent across all of the tables.

Figure 6:
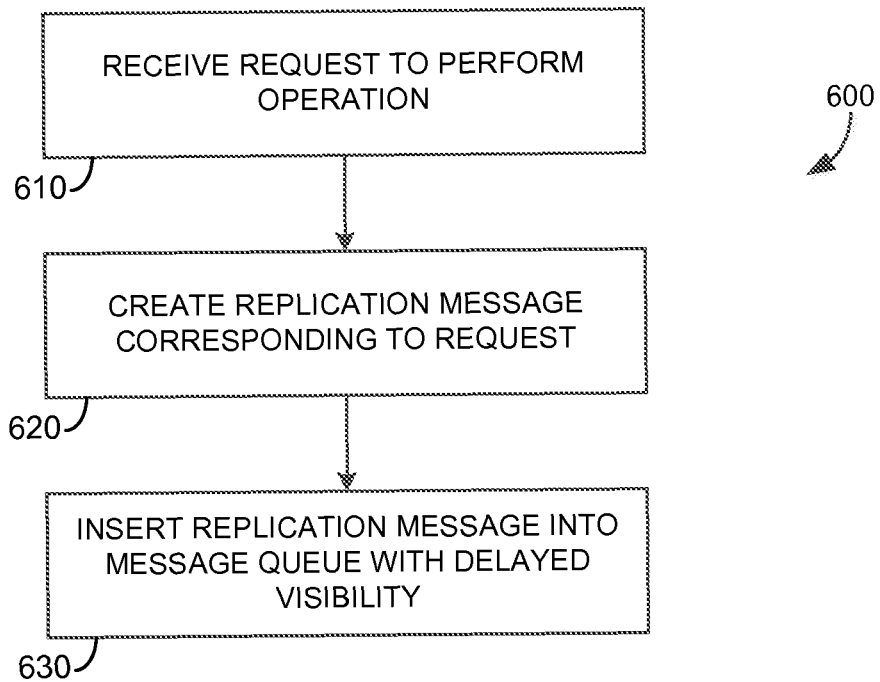
FIG. 6 is a flowchart showing a method of guaranteeing delivery of messages, in accordance with an embodiments described herein.

Turning now to FIG. 6, a method 600 for guaranteeing delivery of messages is shown, in accordance with another aspect of the present invention. Method 600 may be performed on one or more servers in a data center or across multiple data centers.

At step 610, a request to perform an operation may be received. The operation may be to persist a plurality of rows in a source table of a local data store, where the plurality of rows are replicated on one or more target tables at corresponding data stores. For example, the request may be to insert a record into a first table among a plurality of tables, where each table is a replicate of each other. For example, a first table may be replicated so that all of the tables of the plurality of table contain the same data. The operation may be associated with a result.

At step 620, a replication message may be created corresponding to the request. The replication message may indicate a notification to be communicated upon the operation achieving the result. The result of the operation may be persisted in a source storage in a data store, where the message is a replication message corresponding to the operation. The replication message may include instructions to replicate the result of the operation to one or more target storages on corresponding data stores.

At step 630, the replication message may be inserted into a message queue. The replication message may have a delayed visibility. The delayed visibility facilitates maintaining the replication message in the queue until the replication message is processed to communicate the notification. For example, if the request is to replicate the result of an operation, the delayed visibility facilitates maintaining the replication message in the message queue until the instruction to perform the operation on the source storage is successfully performed. For example, an operation may only be partially processed, e.g., a portion of the operation to successfully persist the result in its entirety failed. The operation may need to be performed again to fully persist that data in the source storage. Thus the delayed visibility allows the system to wait for the operation to be successfully persisted the data in the source storage, and process the replication message to communicate the operation to each of the one or more target sources.

Alternatively, it may be determined that the operation was successfully persisted on the source storage in its entirety. Upon determining that the message was successfully persisted on the source storage, a second replication message corresponding to the operation may be created. The second replication message may include instructions to replicate the result of the operation to the one or more target storages in corresponding data stores. The second replication message may be inserted into the message queue, and may have an immediate visibility. For example, the operation may include a plurality of rows to persist in the source storage. Upon successfully performing the operation, the replication message instructs a worker to replicate the plurality of rows on one or more target storages on corresponding data stores.

In some examples, the operation to persist an entirety of the result may be unsuccessful. For example, the operation may be partially processed to the source table, e.g., one or more rows were not persisted to the source table. The operation may continue to attempt to persist the entirety of the result to the source table. For example, the operation may be retried a given number of times to attempt to persist the data. However, after multiple attempts the data may still not be fully persisted. If the goal is eventually consistency, as long as the data that is persisted in the source storage is replicated to the target sources, it may not matter that the entirely of the result was not persisted (e.g., an error message may be provided to a user indicating that the result was not persisted). Furthermore, although the entirety of the result was not persisted, the portion of the result that was persisted may be iteratively processed to replicate to the target sources. For example, if two of five rows were successfully persisted in the source table, the two rows may be replicated (via the replication message) to the target sources. This allows the rows to be consistent through the target storages. Upon determining that the entirety of the result was successfully persisted in the source storage, the replication message in the queue to replicate the result of the operation may be processed and the replication message may be dequeued.

This configuration ensures that a message is added to a message queue, guaranteeing the delivery of the message. By guaranteeing the delivery of messages, this configuration assures that, e.g., a notification will be sent to all target storages.

Figure 7:
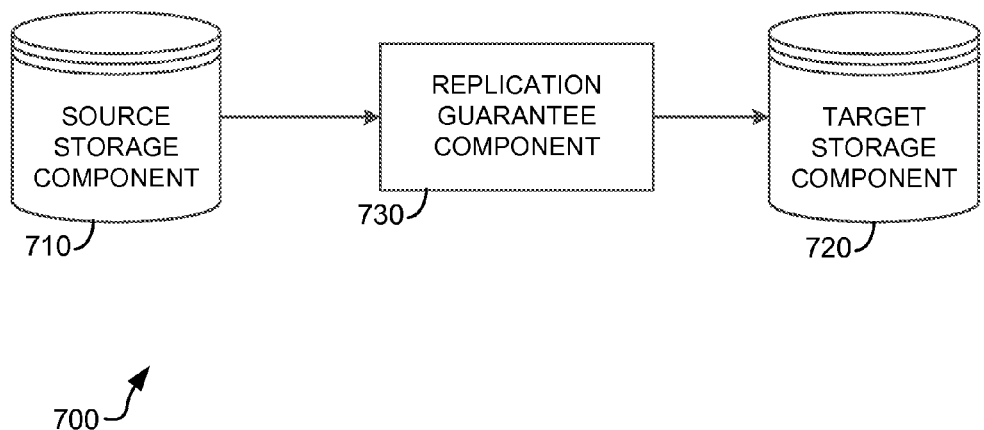
FIG. 7 is a diagram of an exemplary table replication architecture for performing processing replication messages in distributed storage, in accordance with embodiments described herein.

Turning now to FIG. 7, a table replication architecture 700 is shown for performing a method to process replication messages in distributed storage, in accordance with another aspect of the present invention.

Source storage component 710 may be configured to store a result of an operation. For example, the operation may be a new row of a table, and the result is the new row. Source storage component 710 may include one or more source storages. For example, a result of a first operation may be written to a first source storage and a result of a second operation may be written to a second source storage.

Target storage component 720 may be configured to also store the result of the operation. The result may be stored based on a replication message, the replication message including instructions to replicate the result of the operation to target storage component 720.

Replication guarantee component 730 may perform steps to process the replication messages in distributed storage. For example, a request to perform an operation may be received. A result of the operation may be persisted in a source storage on a data store, i.e., the result of the operation may be persisted in a source storage of source storage component 710. A replication message may be created corresponding to the operation. The replication message may be inserted into in the message queue. The message may have a delayed visibility, where the delayed visibility facilitates maintaining the replication message in the queue until the replication message is processed to communicate instructions to replicate the result of the operation on each of the one or more target storages in corresponding data stores.

Replication guarantee component 730 may be configured for performing a latency optimization operation. The latency optimization operation may, upon determining that the result was successfully persisted on the source storage, create a second replication message corresponding to the request, where the second replication message includes instructions to replicate the result of the operation to the one or more target storages in corresponding data stores. The latency optimization operation may also insert the second replication message in the message queue, the second replication message having an immediate visibility. Alternatively, upon determining that the message was successfully persisted on the source storage, the latency optimization operation may modify the delayed visibility time of the replication message to make the message visible immediately.

In some examples, the operation to persist an entirety of the result may be unsuccessful. For example, the operation may be partially processed to source storage component 710, e.g., one or more rows were not persisted to source storage component 710. The operation may continue to attempt to persist the entirety of the result to source storage component 710. For example, the operation may be retried a given number of times to attempt to persist the data. However, after multiple attempts the data may still not be fully persisted. If the goal is eventually consistency, as long as the data that is persisted in source storage component 710 is replicated to target storage component 720, it may not matter that the entirely of the result was not persisted (e.g., an error message may be provided to a user indicating that the result was not persisted). Furthermore, although the entirety of the result was not persisted, the portion of the result that was persisted may be iteratively processed to replicate to target storage component 720. For example, if two of five rows were successfully persisted source storage component 710, the two rows may be replicated (via the replication message) to target storage component 720. This allows the rows to be consistent in target storage component 720. Upon determining that the entirety of the result was successfully persisted in source storage component 710, the replication message in the queue to replicate the result of the operation may be processed and the replication message may be dequeued.

This configuration ensures that a message is added to a message queue, guaranteeing the delivery of the message. By guaranteeing the delivery of messages, this configuration assures that, e.g., a result of the operation will be replicated on each of the one or more target storages in corresponding data stores.

Replication Message Delivery Examples

Figure 8:
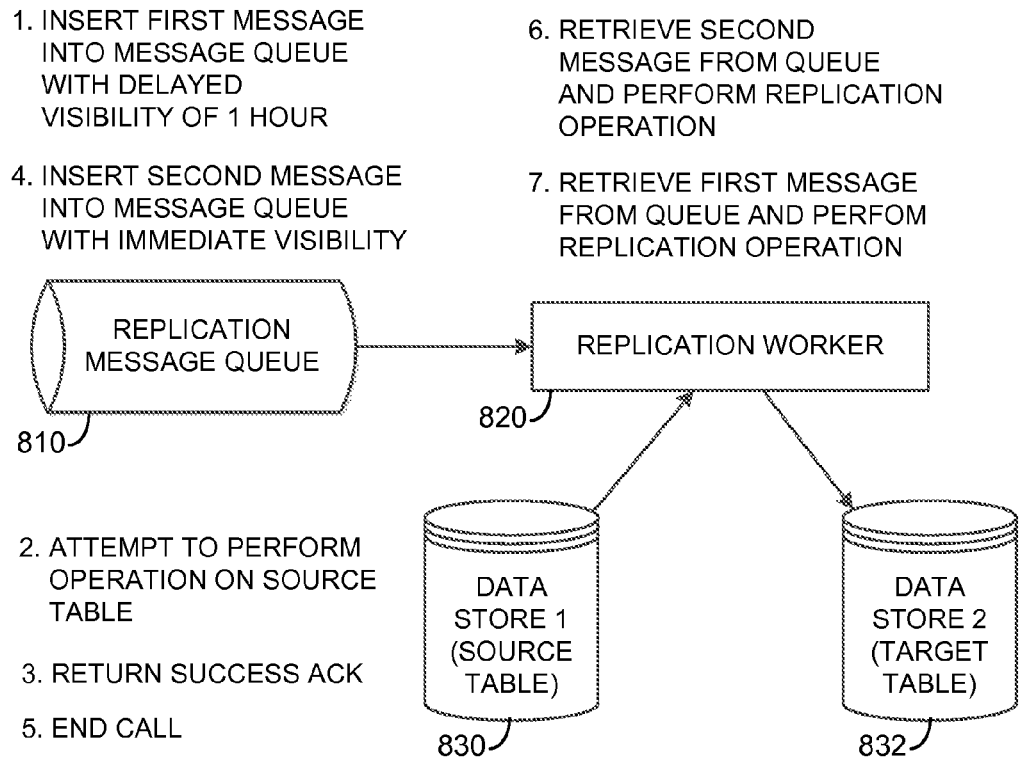
FIG. 8 is a diagram of an example flow where an operation has been successfully performed, in accordance with embodiments described herein.

FIG. 8 depicts an example flow where an operation has been successfully performed. First, a first replication message may be inserted into replication message queue 810 with a visibility of one hour. Then, the operation may be attempted to be performed on the source table 830. In this example, we assume that the operation was successful and the result of the operation has been persisted in source table 830. Then, an acknowledgement indicating that the operation was successful may be returned. Then, a second replication message may be inserted into replication message queue 810 with immediate visibility. Then, the operation may be ended since the operation has been successfully performed. Then, replication worker 820 may retrieve the second message from replication message queue 810 since the second message has an immediate visibility. Although the second message was added to replication message queue 810 after the first message, the first message has a delayed visibility meaning that the first message will not be detected by replication worker 820 until the duration of the delayed visibility time has elapsed. Replication worker 820 may replicate the data (modified by the operation) from source table 830 to all target tables, e.g., target table 832. Sometime thereafter, the first message may be retrieved from replication message queue 810 after the delayed visibility time has elapsed, i.e., one hour. Replication worker 820 may replicate the data from source table 830 to the target tables, e.g., target table 832. Although the second message has previously caused the replication worker 820 to replicate the modified rows across all target tables (making the tables consistent), the first message also causes the replication worker 820 to perform the replication. If the data has not changed between the replications corresponding to the first and second messages, replicating the data does not affect the data (since the data should be the same). This ensures that the data is consistent throughout all of the tables.

In this example, the first replication message remains in the replication message queue 810 until the delayed visibility time has elapsed and the message is retrieved by replication worker 820. Processing a second replication message does not affect the consistency of the data since the data has already been replicated. However, in some examples, the first message can be modified to display with immediate visibility instead of creating a second message if the operation was successful. In some embodiments, the first message can be deleted or not processed if the operation was successful.

Figure 9:
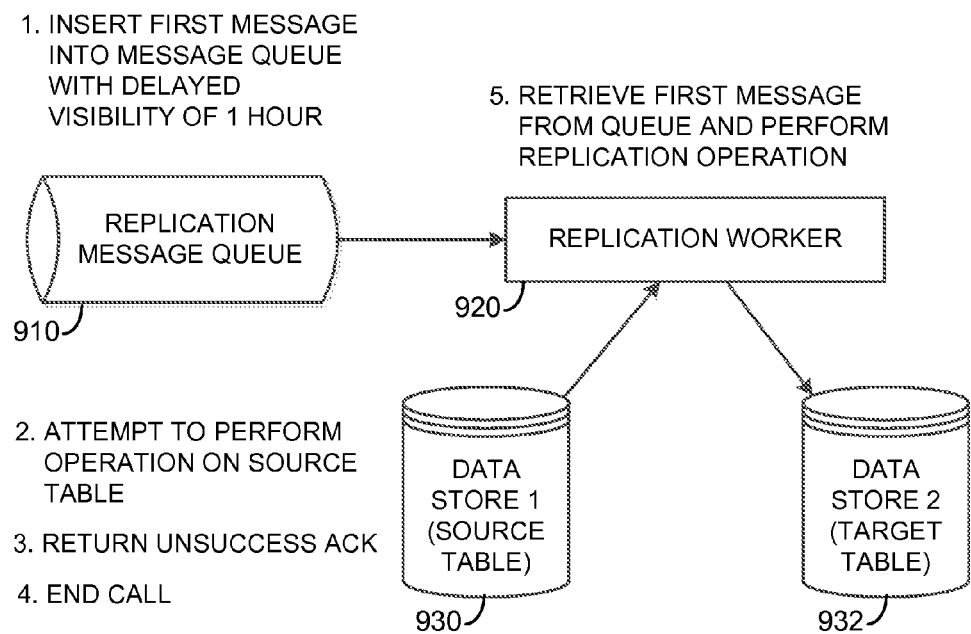
FIG. 9 is a diagram of an example flow where the performance of an operation was unsuccessful, in accordance with embodiments described herein.

FIG. 9 depicts an example flow where an operation is unsuccessful. First, a first replication message may be added to the replication message queue 910 with a visibility of one hour. Next, the operation may be attempted to be performed on source table 930. In this example, we assume that the operation was unsuccessful and the result of the operation has not been persisted in source table 930. Next, an acknowledgement indicating that the operation was unsuccessful may be returned. The operation may be attempted a number of times. If the operation is eventually successful, we can treat it as a successful operation. However, in the case where the operation is ultimately unsuccessful, the operation may be ended since it has failed after numerous attempts. The first message is retrieved from replication message queue 910 after the delayed visibility time has elapsed and replication worker 920 replicates the data from source table 930 to the target tables, e.g., target table 932. Although in this example, since the operation was unsuccessful and the first replication message is retrieved by replication worker 920, since source table 930 was not changed, replicating source table 930 will not affect the constancy of the data throughout all of the data stores.

For both successful or unsuccessful operations to the source table, since the replication messages only instruct the replication worker to replicate records, both scenarios will behave in the same manner (e.g., both scenarios will replicate data to ensure that the data is consistent throughout the tables). This ensures that the rows will always be replicated and will achieve eventual consistency.

Exemplary Operating Environment

Figure 10:
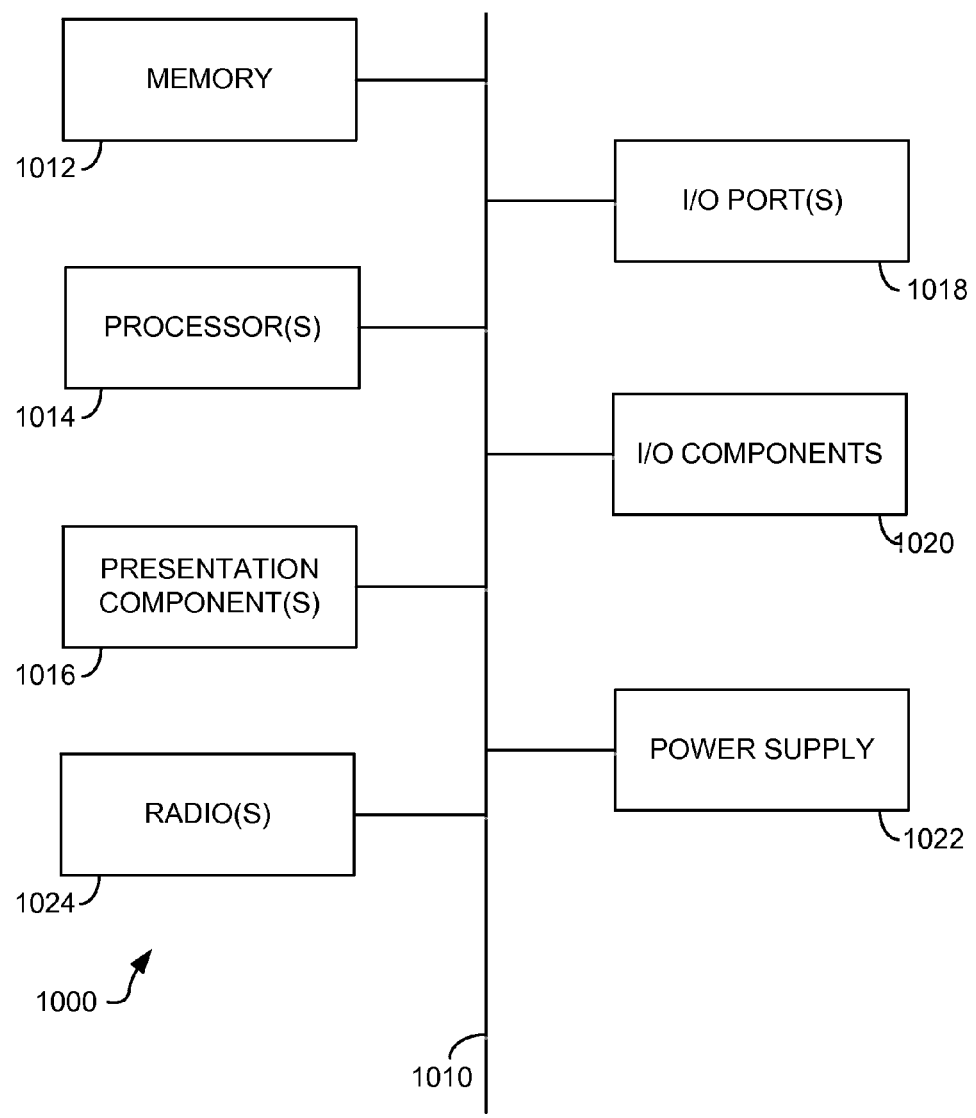
FIG. 10 is a block diagram of an exemplary computing environment suitable for implementing aspects of the invention.

An exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including hand-held devices, consumer electronics, general-purpose computers, specialty computing devices, etc. Aspects of the invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output (I/O) ports 1018, I/O components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component 1020. Also, processors have memory. The inventors hereof recognize that such is the nature of the art, and reiterate that the diagram of FIG. 10 is merely illustrative of an exemplary computing device that can be used in connection with one or more aspects of the invention. Distinction is not made between such categories as "workstation," "server," "laptop," "handheld device," etc., as all are contemplated within the scope of FIG. 10 and refer to "computer" or "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory 1012 may be removable, nonremovable, or a combination thereof. Exemplary memory includes solid-state memory, hard drives, optical-disc drives, etc. Computing device 1000 includes one or more processors 1014 that read data from various entities such as bus 1010, memory 1012 or I/O components 1020. Presentation component(s) 1016 present data indications to a user or other device. Exemplary presentation components 1016 include a display device, speaker, printing component, vibrating component, etc. I/O ports 1018 allow computing device 1000 to be logically coupled to other devices including I/O components 1020, some of which may be built in.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 1014 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the present invention.

A NUI processes air gestures, voice, or other physiological inputs generated by a user. Appropriate NUI inputs may be interpreted as ink strokes for presentation in association with the computing device 1000. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as, stereoscopic camera systems, infrared camera systems, RGB camera systems, and combinations of these for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

A computing device may include a radio. The radio transmits and receives radio communications. The computing device may be a wireless terminal adapted to received communications and media over various wireless networks. Computing device 10100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Accordingly, embodiments of the invention may be described in the general context of computer-executable instructions, such as program modules, being executed by a computer. Generally, program modules include routines, programs, objects, components, data structures, etc., that perform particular tasks or implement particular abstract data types. The embodiments may also be practiced in distributed computing environments or cloud environments where tasks are performed by remote-processing devices that are linked through a communications network. In a distributed computing environment, program modules may be located in both local and remote computer storage media including memory storage devices.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

Aspects of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage media storing computer-executable instructions that, when executed by a computing device having a processor, cause the computing device to perform a method for guaranteeing delivery of replication messages in distributed storage systems, the method comprising:
   receiving a request to perform an operation;
   creating a first replication message corresponding to the request, the first replication message comprising instructions to replicate the result of the operation to one or more target storages in corresponding data stores;
   inserting the first replication message into a message queue, the first replication message having a delayed visibility;
   performing the operation, a result of the operation being persisted in a source storage in a data store;
   upon determining that the result was successfully persisted in the source storage, creating a second replication message corresponding to the request, the second replication message comprising instructions to replicate the result of the operation to the one or more target storages in the corresponding data stores; and
   inserting the second replication message in the message queue, the second replication message having immediate visibility.

2. The media of claim 1, wherein the source storage is a source table on a local data store and the one or more target storages are target tables on remote data stores.

3. The media of claim 2, wherein the operation comprises writing a set of rows to the source table in the data store.

4. The media of claim 1, wherein the one or more target storages in corresponding data stores comprise target tables for replicating the result.

5. The media of claim 1, wherein the first replication message further comprises instructions corresponding to the request, the instructions including one or more of the one or more target storages, a time stamp, and unique key corresponding to the result of the operation to be replicated and persisted in the one or more target storages.

6. The media of claim 1, wherein the delayed visibility time is a quantified time period that is at least longer than a time during which the operation is performed and the result persisted in the source storage.

7. The media of claim 1, wherein the delayed visibility time is quantified to factor at least one immediate retry of the operation caused by transient errors.

8. The media of claim 1, wherein the second replication message optimizes replication latency in that replication of the result of the operation is performed immediately.

9. The media of claim 1, wherein the method is performed as a background process.

10. A computer-implemented method for guaranteeing delivery of messages, the method comprising:
receiving a request to perform an operation, the operation being associated with a result, wherein the result of the operation is persisted in a source storage in a data store, wherein the message is a replication message corresponding to the request, wherein the replication message comprises instructions to replicate the result of the operation to one or more target storages on corresponding data stores, and wherein the replication message is inserted into the message queue;
creating a message corresponding to the request, the message indicating a notification to be communicated upon the operation achieving the result;
inserting the message in a message queue, the message having a delayed visibility, the delayed visibility facilitating maintaining the message in the queue until the message is dequeued upon communicating the notification; and
determining that the operation was successfully persisted in the source storage;
upon determining that the message was successfully persisted in the source storage, creating a second replication message corresponding to the request, wherein the second replication message comprises instructions to replicate the result of the operation to the one or more target storages on corresponding data stores; and
inserting the second replication message into the message queue, the second replication message having an immediate visibility.

11. The method of claim 10, further comprising:
partially processing the operation to a source table upon identifying an indication of a failure to perform the operation to successfully persist an entirety of the result;
iteratively processing the replication message in the queue upon identifying the indication of the failure to perform the operation to successfully persist the entirety of the result, wherein the iteratively processing comprises replicating a portion of the result that is successfully persisted;
upon determining that the entirety of the result was successfully persisted in the source storage, processing the replication message in the queue to replicate the result of the operation; and
dequeueing the replication message.

12. The method of claim 10, wherein the operation comprises a plurality of rows to persist in a source storage of a local data store, wherein the plurality of rows are replicated on one or more target storages on corresponding data stores.

13. A system for performing processing of replication messages in distributed storages, comprising:
a source storage component configured to store a result of an operation;
a replication guarantee component configured to:
receive a request to perform the operation, the result of the operation being persisted in the source storage component on a data store;
create a replication message corresponding to the request; and
insert the replication message into the message queue, the message having a delayed visibility, wherein the delayed visibility facilitates maintaining the replication message in the queue until the replication message is dequeued upon communicating instructions to replicate the result of the operation on each of one or more target storages in corresponding data stores; and
a target storage component configured to store the result of the operation, wherein storing the result is based on the replication message, the replication message comprising instructions to replicate the result of the operation on the target storage component; and
the replication guarantee component further configured to:
perform a latency optimization operation, wherein the latency optimization operation comprises:
upon determining that the result was successfully persisted on the source storage, creating a second replication message corresponding to the request, wherein the second replication message comprises instructions to replicate the result of the operation to the one or more target storages in corresponding data stores; and
inserting the second replication message in the message queue, the second replication message having an immediate visibility.

14. The system of claim 13, wherein the replication guarantee component is configured for performing a latency optimization operation, wherein the latency optimization operation comprises:
upon determining that the message was successfully persisted on the source storage, modifying the delayed visibility time of the replication message to make the message visible immediately.

15. The system of claim 13, wherein the replication guarantee component is configured for guaranteeing replication of the result of the operation, wherein guaranteeing replication of the result of the operation comprises:
partially processing the operation to a source table upon identifying an indication of a failure to perform the operation to successfully persist an entirety of the result.

16. The system of claim 15, wherein guaranteeing replication of the result of the operation further comprises:
iteratively processing the replication message in the queue upon identifying the indication of the failure to perform the operation to successfully persist the entirety of the result, wherein the iteratively processing comprises replicating a portion of the result that is successfully persisted; and upon determining that the entirety of the result was successfully persisted in the source storage, processing the replication message in the queue to replicate the result of the operation; and dequeueing the replication message.

17. The system of claim 13, wherein the result of the operation is persisted in a source storage of the source storage component.

* * * * *